(12) United States Patent
Horwitz et al.

(10) Patent No.: US 7,302,055 B1
(45) Date of Patent: Nov. 27, 2007

(54) DISCHARGING ENVELOPE DETECTOR

(75) Inventors: Lior Horwitz, Givat-Zeev (IL); Noam Avni, Jerusalem (IL); Simoni Ben-Michael, Givat-Zeev (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/516,337

(22) Filed: Mar. 1, 2000

(51) Int. Cl.
*H04M 1/00* (2006.01)
*H04M 9/00* (2006.01)

(52) U.S. Cl. .......................... 379/399.01; 379/387.01; 327/95

(58) Field of Classification Search .................. 327/39, 327/47, 58, 59, 61, 62, 306, 317, 362, 72, 327/77, 91, 60, 95, 96; 330/149; 379/387.01, 379/399.01
See application file for complete search history.

(56) References Cited

U.S. PATENT DOCUMENTS

| | | | | |
|---|---|---|---|---|
| 4,054,804 A | * | 10/1977 | Tanaka | ........................ 327/278 |
| 4,074,149 A | * | 2/1978 | Naaijer | ......................... 327/59 |
| 4,159,448 A | * | 6/1979 | Parham | ....................... 370/212 |
| 4,160,175 A | * | 7/1979 | Trout | ........................... 327/72 |
| 4,190,862 A | * | 2/1980 | Citta | .......................... 348/735 |
| 4,866,301 A | * | 9/1989 | Smith | .......................... 327/60 |
| 4,992,674 A | * | 2/1991 | Smith | .......................... 327/59 |
| 6,137,375 A | * | 10/2000 | Li | ............................... 331/175 |
| 6,348,816 B1 | * | 2/2002 | Havens et al. | ................. 327/58 |
| 6,600,344 B1 | * | 7/2003 | Newman et al. | .............. 327/58 |

* cited by examiner

*Primary Examiner*—Binh K. Tieu
(74) *Attorney, Agent, or Firm*—Schwegman, Lundberg & Woessner, P.A.

(57) ABSTRACT

A receiver to detect pulses on a home phone wiring network using envelope detection. The receiver comprises an integrating capacitor charged by a first current source responsive to a differential signal propagated on the wiring network, and discharged by a FET in combination with a second current source. The combination of the FET and the second current source allows the capacitor to be quickly discharged in a smooth fashion. An application of this receiver is for a PHY according to the Home Phoneline Networking Alliance.

13 Claims, 9 Drawing Sheets

DISCHARGING ENVELOPE DETECTOR

FIELD

The present invention relates to analog circuits, and more particularly, to an envelope detector circuit for use in a communication system.

BACKGROUND

The Home Phoneline Networking Alliance (HomePNA) is an incorporated, non-profit association of companies working to bring networking technology to the home. See www.homepna.org. HomePNA envisions bringing Ethernet technology to the home by utilizing existing home phone wiring for the network physical medium. HomePNA provides specifications for the physical layer (PHY), its interface to an Ethernet MAC (Media Access Control), and its interface to the home phone wiring. See the IEEE (Institute of Electrical and Electronic Engineers) 802.3 standard for Ethernet.

The position of a HomePNA PHY in relationship to the OSI (Open Systems Interconnection) model is illustrated in FIG. 1. Logical Link Control (LLC) 102 and MAC 104 are implemented in accordance with IEEE 802.3, and HomePNA PHY 106 communicates with MAC 104 via interface 108. Additional sublayers, and other optional layers, may be added to the layers shown in FIG. 1 so that PHY 106 may provide services to other communication protocols, such as Gigabit Ethernet. In practice, PHY 106 and MAC 104 may be integrated on a single die, so that interface 108 is not readily visible.

PHY 106 receives a MAC frame from MAC 104, strips off the 8 octets of preamble and delimiter from the MAC frame, adds a HomePNA PHY header to form a HomePNA PHY frame, and transmits a PHY frame on physical medium 109. FIG. 2 illustrates HomePNA PHY framing. A PHY frame comprises Ethernet Packet 202, and appended to Ethernet Packet 202 is a HomePNA PHY header, comprising SYNC interval 204, Access ID (Identification) 206, Silence interval 208, and PCOM field 210.

A PHY frame is transmitted on physical medium 109 utilizing pulse position modulation (PPM). All PHY symbols transmitted on physical medium 109 comprise a pulse formed of an integer number of cycles of a square wave that has been filtered with a bandpass filter. The position of the pulse conveys the transmitted symbol. Differential signaling is employed, in which a pulse and its negative are transmitted on two wires for each transmitted symbol. However, for simplicity of discussion, we consider only one component of the differential signal when describing the signal waveform.

As indicated in FIG. 2, transmission begins with SYNC symbol 0, and Access ID field 206 is coded into seven AID (Access ID) symbols. SYNC symbol 0 may also be denoted as AID symbol 0. Access ID symbols 1 through 4 are used to identify individual stations to enable reliable collision detection. Access ID symbols 5 and 6 are used to transmit remote control management commands. AID symbol 7 is a silence interval.

SYNC symbol 0 and each AID symbol are 129 tics long, where 1 tic is defined as $(7/60)10^{-6}$ seconds, which is approximately 116.667 nanoseconds. AID symbols 1 through 7 begin with a blanking interval of 60 tics, followed by a pulse positioned within one of four time slots to convey two bits of information. The time slots are separated by 20 tics, and are at positions 66, 86, 106, and 126 tics from the beginning of an AID symbol interval. SYNC symbol 0 is composed of a SYNC_START pulse beginning at tic=0 and a SYNC_END pulse beginning at tic=126.

In the example of FIG. 2, AID symbols 1 through 4 represent the Access ID word 00101101, where AID symbol 1 represents AID0=1 and AID1=0, AID symbol 2 represents AID2=1 and AID3=1, AID symbol 3 represents AID4=0 and AID5=1, and AID symbol 4 represents AID6=0 and AID7=0. AID symbols 5 and 6 represent the control word 0001, where AID symbol 5 represents Ctrl0=1 and Ctrl1=0, and AID symbol 7 represents Ctrl2=0 and Ctrl3=0.

A collision is detected only during AID symbols 0 through 7. If a transmitting station reads back an AID value that does not match its own, then a collision is indicated, and a JAM signal is transmitted to alert other stations. Non-transmitting stations may also detect non-conforming AID pulses as collisions. Only a transmitting station emits a JAM signal.

Examples of transmitted and received pulses for three AID symbols are indicated in FIGS. 3 and 4, respectively. In FIG. 4, SYNC_START and SYNC_END pulses indicate AID symbol 0. AID symbol 1 comprises a pulse in position 1 (tic=86), and AID symbol 2 comprises a pulse at position 2 (tic=106). A receiving PHY performs full-wave rectification of a received signal, and compares the envelope of the rectified signal with an AID slice threshold. The PHY detects a received pulse if its envelope exceeds the AID slice threshold. As soon as a pulse is detected by a PHY, the PHY disables further indications of detection until a time AID_END_BLANK (located at tic=61) from the beginning of the pulse, after which detection indication must be re-enabled for the next received pulse.

As indicated in FIG. 2, the data symbols in a PHY frame comprise two receiver training symbols, PCOM symbols, and symbols coding Ethernet packet 202. (PCOM symbols are reserved for future use to be used by a local management entity, and are ignored by the PHY.) Referring now to FIG. 5, a data symbol interval begins with the beginning of a pulse, which defines tic=0 for the symbol interval. Symbol timing (in tics) is measured from tic=0. Except for the first data symbol interval, the beginning of a data symbol time interval is marked by the position of the pulse for the previous data symbol. The position of a pulse relative to the beginning of its time interval conveys the symbol information. Each position is separated by one tic. When a pulse begins transmission, the previous symbol interval ends and a new one immediately begins. Time intervals for data symbols are therefore variable, depending upon the transmitted data.

For example, as shown in FIG. 5, the beginning of the first data symbol interval is indicated by START_TX_PULSE at tic=0, and the information conveyed by Data Symbol 1 is indicated by the position of Pulse 1 in FIG. 5. Pulse 1 then defines the beginning of the time interval for the next data symbol, Data Symbol 2.

Data receive timing is indicated in FIG. 6. In the example of FIG. 6, data symbol intervals for Data Symbol 1 and Data Symbol 2 are illustrated. The received waveform is formed from the transmitted pulse, along with any distortions and reflections that occur in the wiring network. The PHY detects the point at which the envelope crosses a threshold, denoted by Data_Slice_Threshold. Immediately after threshold detection, the PHY disables indication of detection for a time period END_DATA_BLANK, which is equal, in tics, to pulse position number 0 minus 3. Detection indication is enabled after END_DATA_BLANK.

Thus, as indicated in FIGS. 4 and 6, a HomePNA PHY requires proper envelope detection of received waveforms. Envelope detection usually involves full-wave rectification followed by integration, where the integration is often performed by charging a capacitor. However, noise spikes on the home telephone network may lead to detection error. A detection error may result in inaccurately estimating pulse position (timing jitter), leading to incorrect symbol decoding. A detection error may also result in a detection being declared when no pulse was actually transmitted by another station, i.e., a false alarm. A detection error may also result in the failure to declare a detection when a pulse was in fact transmitted.

Using large capacitors for signal integration may reduce detection error. Furthermore, in many prior art envelope detectors, the integrating capacitor is always being discharged by a discharge resistor. However, this type of discharging may cause output ripple, which may lead to timing jitter or an increase in the false alarm rate. Using a large capacitor, or providing for a longer discharge time, may reduce ripple.

However, using large capacitors, and using long discharge times, lead to various problems. In custom VLSI (Very Large Scale Integration) technology, large capacitors are expensive in terms of die area. Furthermore, the integrating capacitor should be discharged before the next arriving pulse, otherwise a slow discharging time may lead to detection error. Embodiments of the present invention address these problems, and are well suited to network communication utilizing home phone wiring as envisioned by the Home Phoneline Networking Alliance.

DESCRIPTION OF EMBODIMENTS

Figure 1:
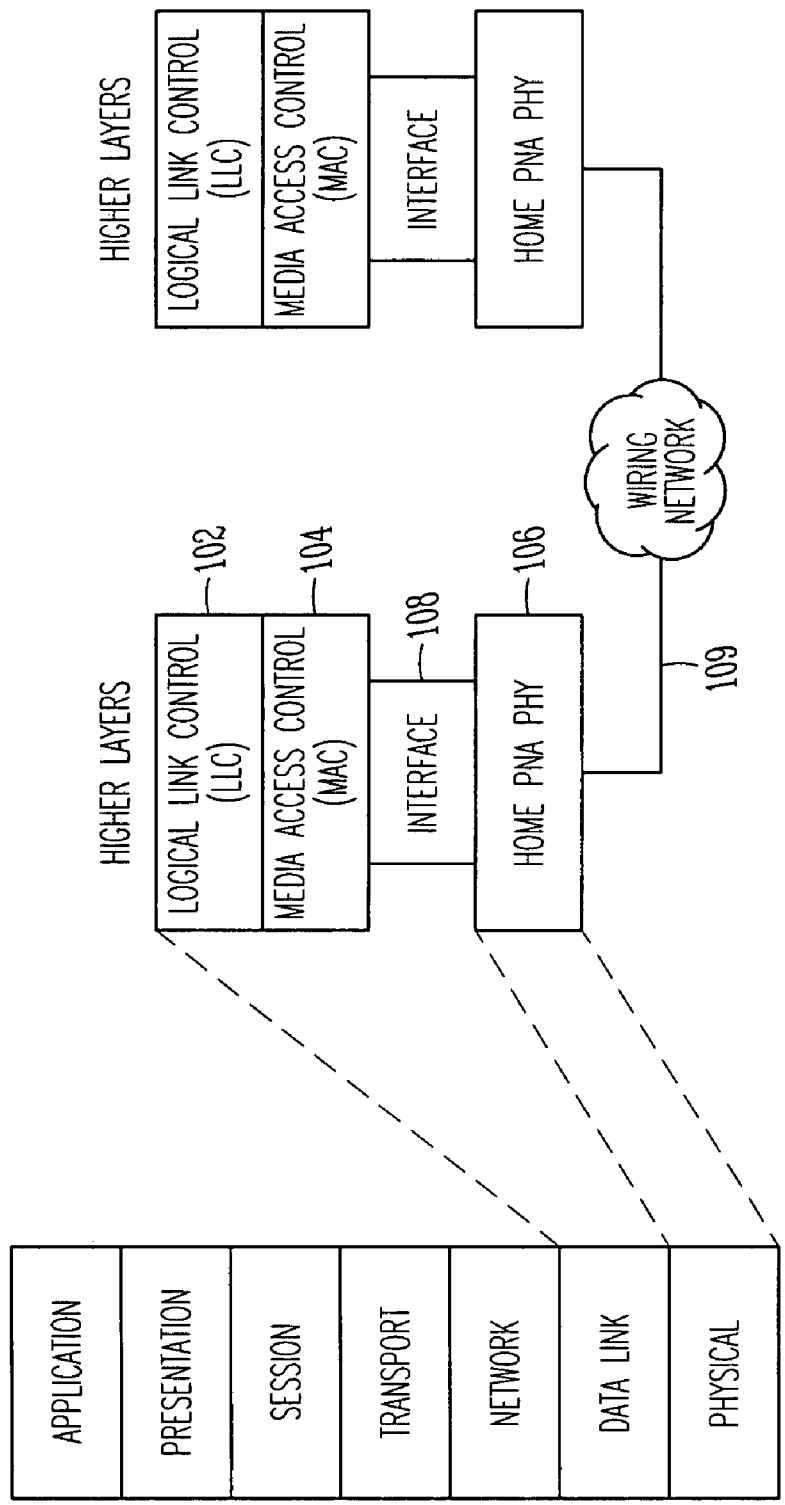
FIG. 1 illustrates the position of a HomePNA PHY within the OSI communication protocol stack.
Figure 2:
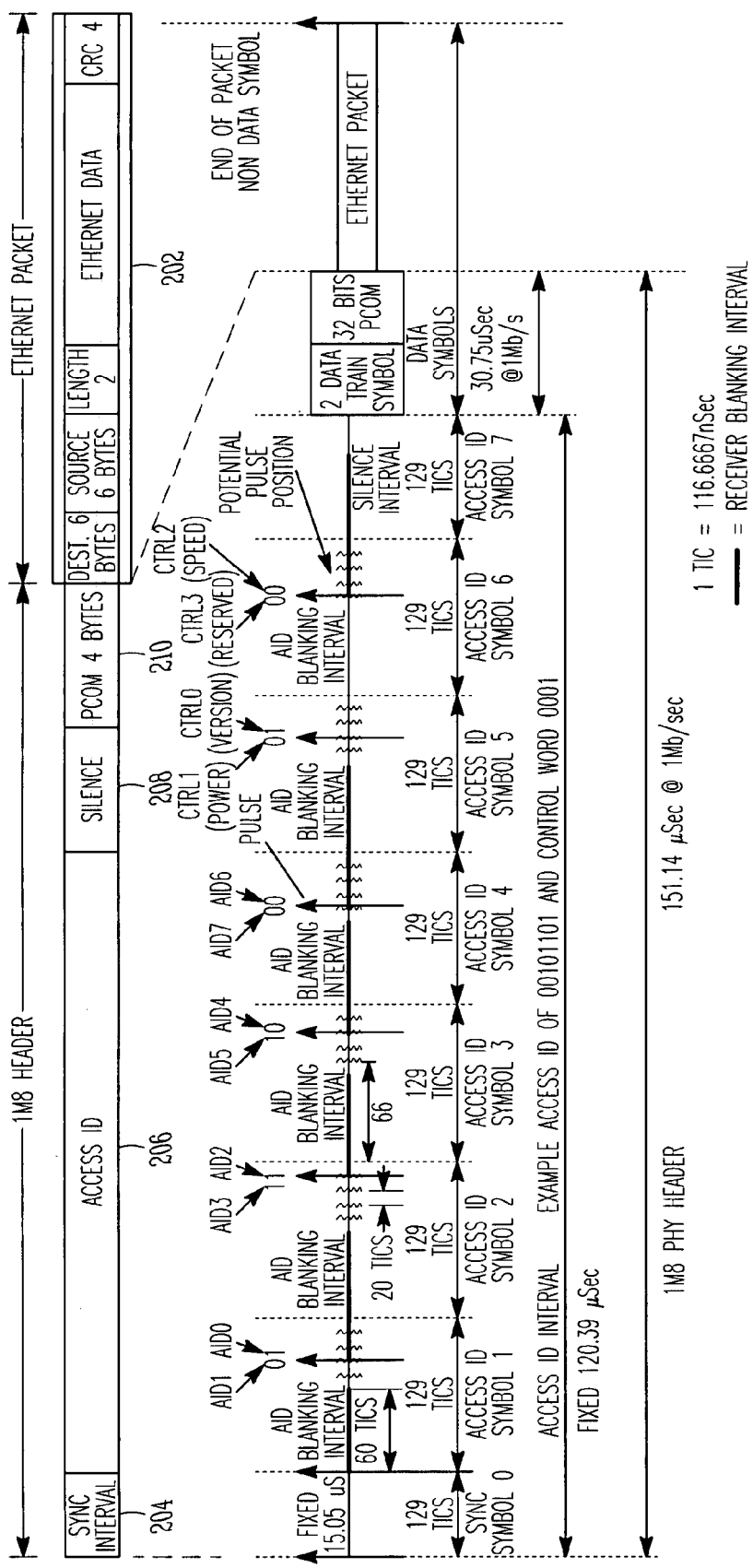
FIG. 2 illustrates HomePNA PHY framing.
Figure 3:
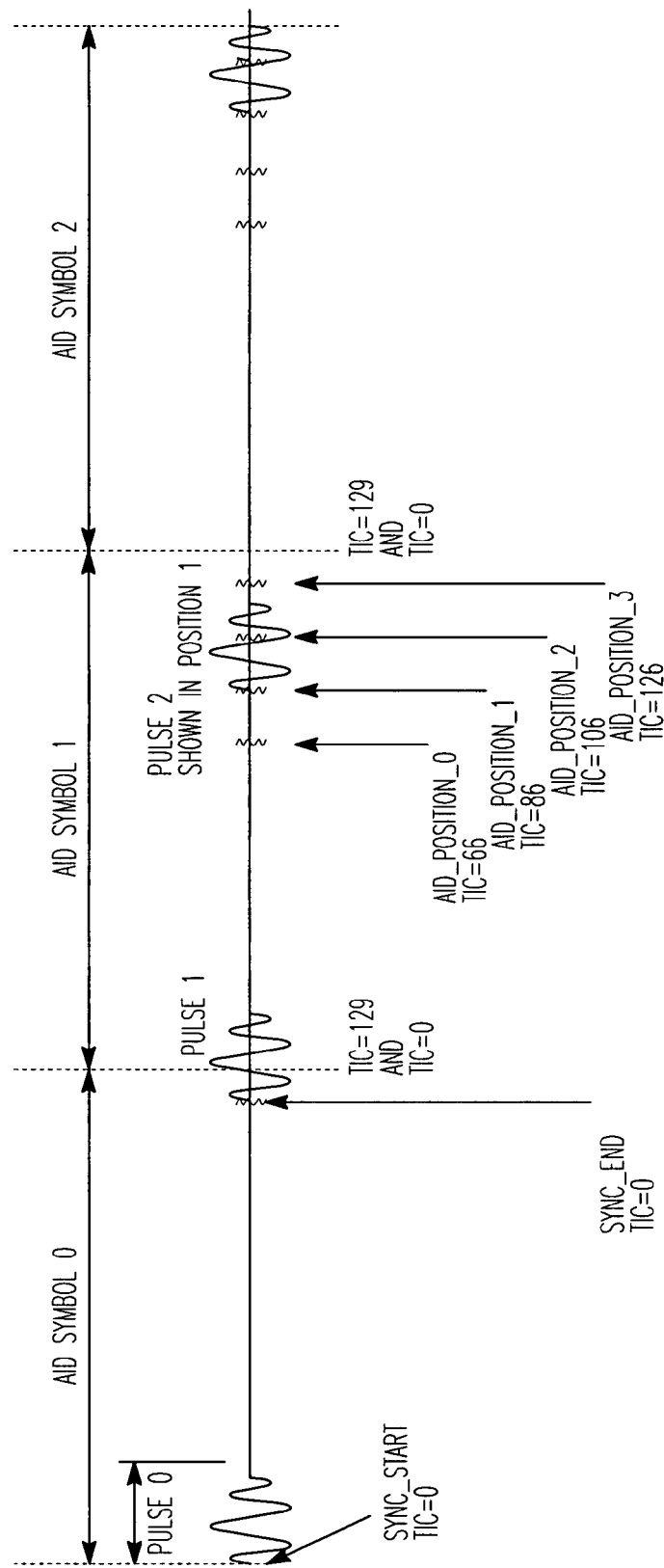
FIG. 3 illustrates waveforms and timing for three transmitted Access ID symbols.
Figure 4:
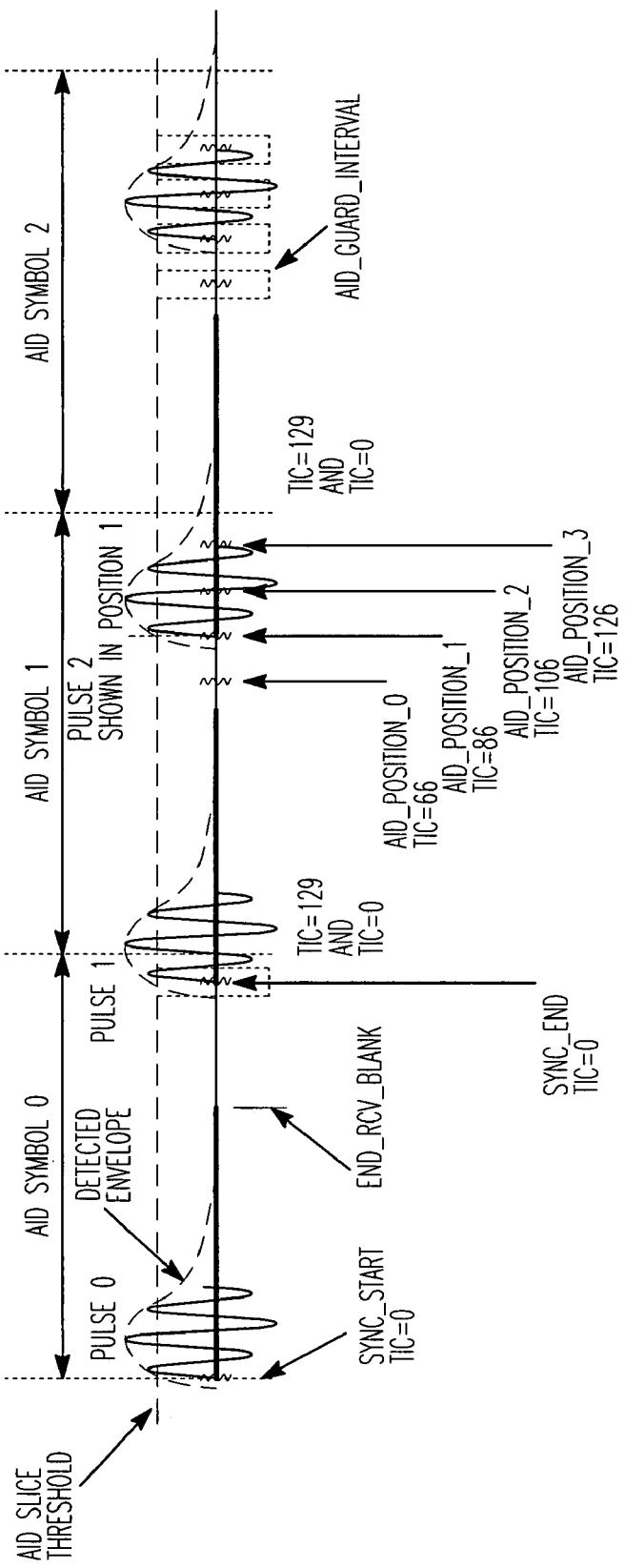
FIG. 4 illustrates waveforms and timing for three received Access ID symbols.
Figure 5:
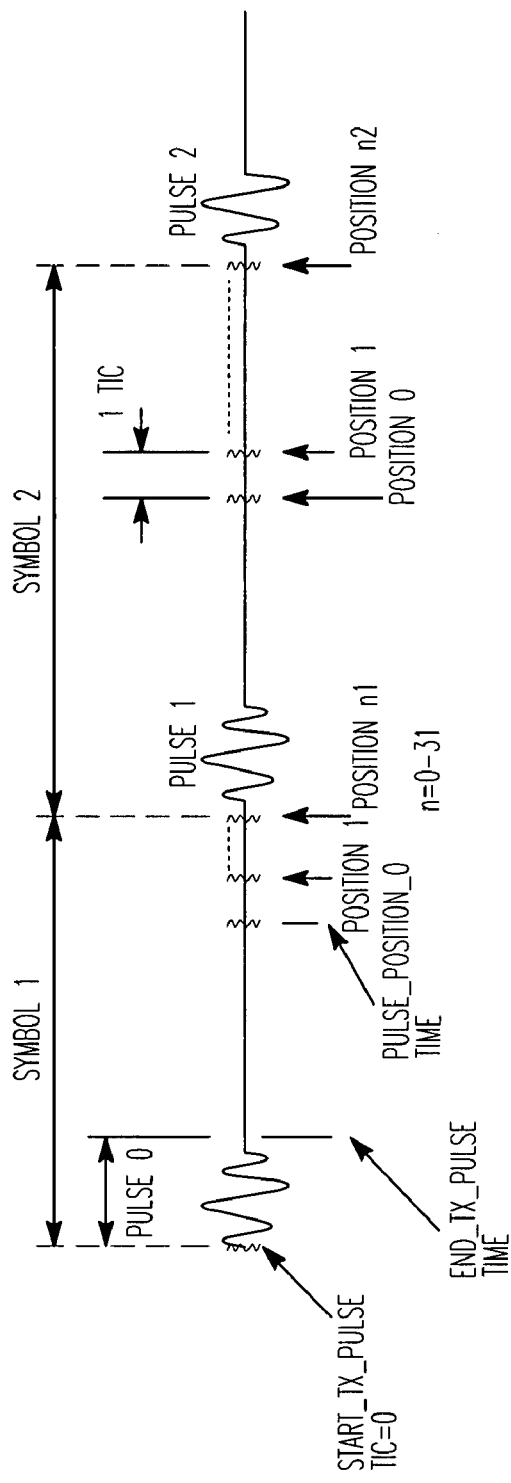
FIG. 5 illustrates waveforms and timing for two transmitted data symbols.
Figure 6:
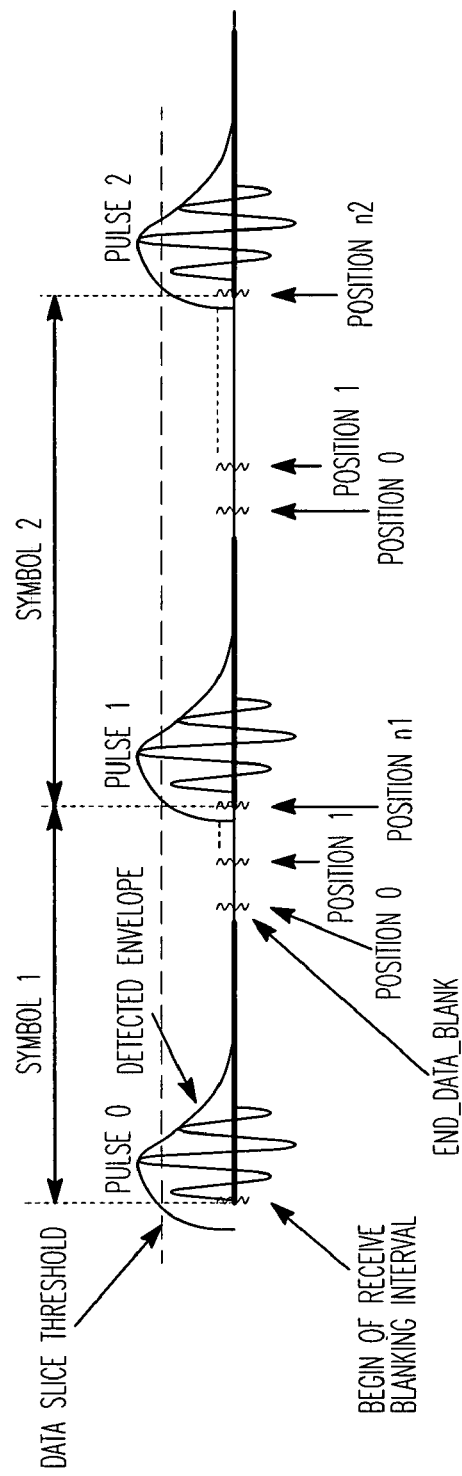
FIG. 6 illustrates waveforms and timing for two received data symbols.
Figure 7:
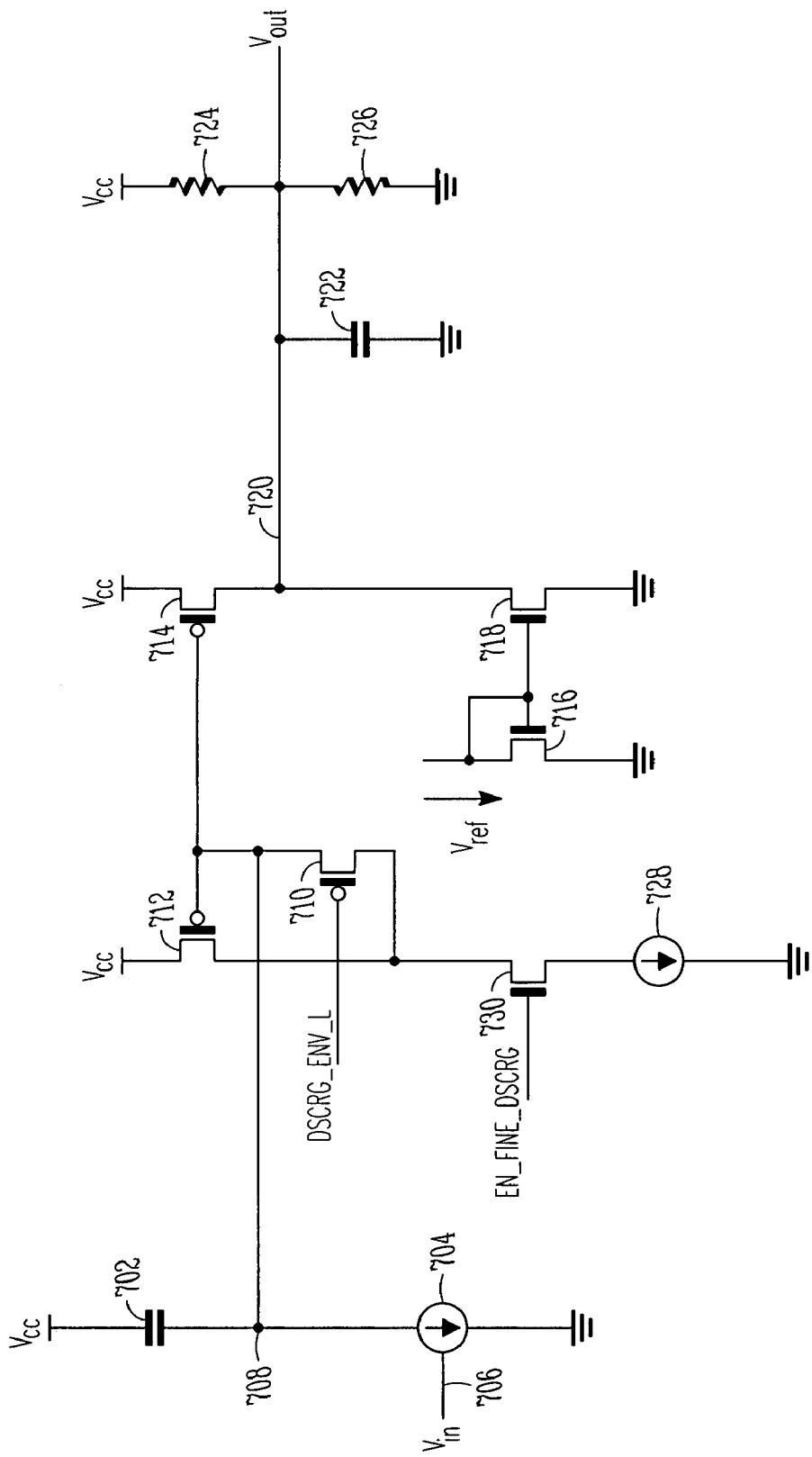
FIG. 7 is a high-level circuit according to an embodiment of the present invention.

FIG. 7 provides a high-level circuit model of an embodiment of the present invention. Capacitor 702 is an integrating capacitor that is charged by current sink 704. Current sink 704 is a voltage controlled current sink responsive to input voltage $V_{in}$ at input terminal (or port) 706. Input voltage $V_{in}$ may be a differential input voltage, although only one terminal to current sink 704 is explicitly shown. Input voltage $V_{in}$ is the voltage propagated on physical medium 109 (the home phone lines) and received by a PHY.

Current sink 704 performs full-wave rectification, so that when a pulse is received by the PHY, the current drawn (sunk) at node 708 by current sink 704 is indicative of the rectified received pulse. While capacitor 702 is being charged, pMOSFET 710 (p-Metal Oxide Semiconductor Field Effect Transistor) is OFF. Because capacitor 702 serves as an integrator, the voltage at node 708 is indicative of the envelope of the received pulse when capacitor 702 is being charged by current sink 704.

Transistor 714, along with current mirror transistors 716 and 718 biased by a reference current $I_{ref}$, comprise a high input impedance buffer to sample the envelope voltage at node 708, so that the output voltage, $V_{out}$, at node 720 is indicative of the envelope voltage at node 708. Capacitor 722 serves as a lowpass filter, and resistors 724 and 726 serve as a voltage divider to provide a DC voltage level shift.

When the output voltage $V_{out}$ at node 720 exceeds a threshold (e.g., AID_Slice_Threshold during the AID portion of the received PHY frame, or Data_Slice_Threshold during the data symbol portion of the received PHY frame), signal line DSCRG_ENV_L connected to the gate of pMOSFET 710 is switched LOW so that pMOSFET 710 is switched ON to discharge capacitor 702. With pMOSFET 710 switched ON, pullup pMOSFET 712 acts as a voltage controlled current source to node 708, so that the potential difference across capacitor 702 is reduced, thereby discharging capacitor 702.

Using pullup pMOSFET 712 to discharge capacitor 702 provides for faster discharging than using a discharge resistor, thereby providing for a low detection error. However, it is found that for the HomePNA networking environment, in many instances $V_{out}$ drops too low (it has an inverted spike) if capacitor 702 is discharged too quickly by pullup pMOSFET 712, and this may cause signal interference with other circuit elements of the PHY. To remedy this problem, current sink 728 is provided.

Current sink 728 is connected to node 708 via serially connected transistors 730 and 710. Transistor 730 is switched ON by setting HIGH signal line EN_FINE_DSCRG. With EN_FINE_DSCRG set HIGH, current sink 728 is enabled in the sense that it sinks current from node 708 to ground when DSCRG_ENV_L is switched LOW.

Suppose current sink 728 is enabled (EN_FINE_DSCRG set HIGH). As the voltage at node 708 is brought lower due to capacitor 702 being charged by current sink 704, pullup pMOSFET 712 switches ON and supplies drain current to current sink 728 via nMOSFET 730. When DSCRG_ENV_L is switched LOW due to the voltage $V_{out}$ at node 720 exceeding a threshold (e.g., detection of a pulse), the voltage at node 708 starts to rise as capacitor 702 is being discharged by pMOSFET 712. Because the gate of pMOSFET 712 is connected to node 708, the rising voltage at node 708 causes pMOSFET 712 to conduct less drain current. This results in a larger fraction of the current being sunk by current sink 728 to be drawn from capacitor 702, so that the discharge rate of capacitor 702 is slowed down. The net effect of pMOSFET 712 in combination with current sink 728 is to allow for a "fine" discharge of capacitor 702, so that the output voltage $V_{out}$ transitions from a high level indicative of capacitor 702 being charged to a low level indicative of capacitor 702 being discharged without having an inverted spike.

Figure 8:
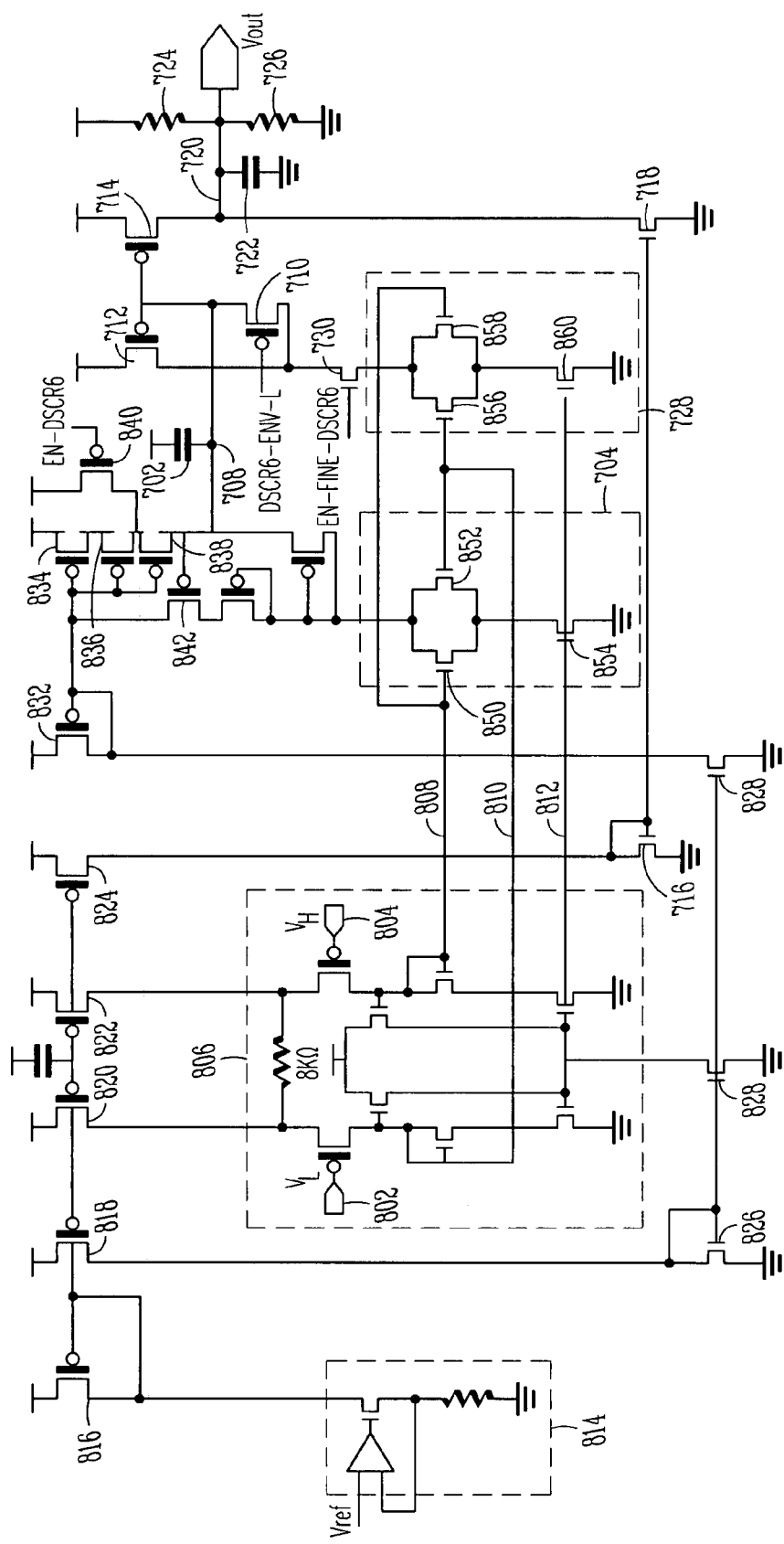
FIG. 8 is a more detailed circuit according to the embodiment of FIG. 7.

FIG. 8 provides a more detailed circuit of the embodiment of FIG. 7, where like numerals among FIGS. 7 and 8 denote similar circuit components. A differential voltage input signal is applied to input terminals 802 and 804. The circuit components within dashed box 806 comprise a differential amplifier, providing a differential output voltage on lines 808 and 810, and an output voltage on line 812.

The circuit components within dashed boxes 704 and 728 serve as voltage-controlled current sinks, and are controlled by the voltages on lines 808, 810, and 812 so as to provide current sinks indicative of $|V_H-V_L|$, the magnitude of the difference between the input voltages at input terminals 802 and 804. As indicated in FIG. 8, voltage-controlled current sink 704 is comprised of the differential transistor pair 850 and 852 cascaded with current sink transistor 854, and voltage-controlled current sink 728 is comprised of the differential transistor pair 856 and 858 cascaded with current sink transistor 860. Thus, in FIG. 7 current sink 728 may be a voltage-controlled current sink similar to that of current sink 704 in that the current sunk by current sink 728 is indicative of the full-wave rectified received waveform.

The circuit components within dashed box 814 provide a bias voltage to the current mirror transistors 816, 818, 820, 822, and 824. Transistor 818 provides a bias current to transistor 826, where transistors 826, 828, and 830 comprise a current mirror. Transistor 830 provides a bias current to transistor 832. Transistor 832 biases transistors 834, 836, and 838. With transistor 840 OFF (EN_DSCRG is HIGH), transistors 834, 836, and 838 provide current to current sink 704. If transistor 840 is ON (EN_DSCRG is LOW), then transistors 834 and 836 are bypassed and transistor 838 supplies more current to current sink 704 than when transistor 840 is OFF. Supplying more current to current sink 704 will cause integrating capacitor 702 to be charged at a slower rate by current sink 704, and thus EN_DSCRG allows for adjustment of the charging rate of integrating capacitor 702 due to current sink 704.

As capacitor 702 becomes charged, it provides less current to current sink 704. But as capacitor 702 charges, the node voltage at node 708 decreases, so that pMOSFET 842 supplies more current to current sink 704 so as to offset the reduction in current supplied by capacitor 702.

Figure 9:
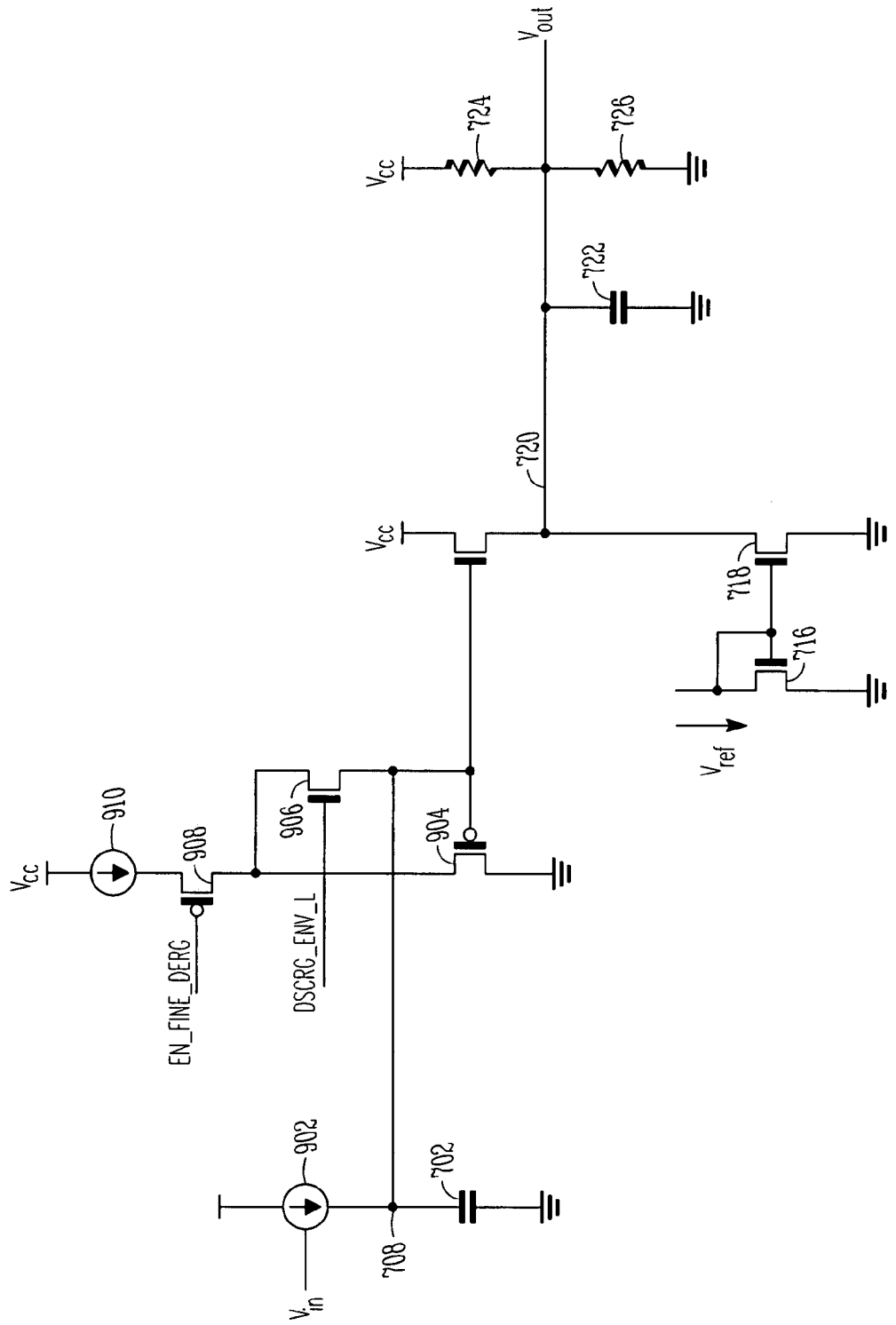
FIG. 9 is a high-level circuit according to another embodiment of the present invention.

Variations may be made to the described embodiments without departing from the scope of the claims concluding this specification. For example, another embodiment is illustrated in FIG. 9, which functions in similar fashion to that of FIG. 7, but where pulldown transistor 904 is used instead of pullup transistor 712, and where current sources 902 and 910 are used instead of current sinks 704 and 728. For the embodiment of FIG. 9, integrating capacitor 702 is charged by current source 902 when nMOSFET 906 is OFF. After capacitor 702 is charged such that the output voltage $V_{out}$ exceeds some threshold, pulldown transistor 904 discharges capacitor 702 when nMOSFET 906 is switched ON. When nMOSFET 908 is switched ON, the combination of pulldown nMOSFET 904 with current source 910 helps to prevent spikes in the output voltage $V_{out}$, as described earlier regarding FIG. 7.

As is understood from the embodiments of FIGS. 7 and 9, current sources may be used instead of current sinks. Consequently, in the claims concluding this specification, it is to be understood that the term "current source" may mean a current source or a current sink.

What is claimed is:

1. A PHY (physical layer) responsive to first and second voltages on a network medium, the PHY comprising:
    a capacitor;
    a first current source to charge the capacitor by conducting a first conduction current indicative of the magnitude of the difference of the first and second voltages; and
    a transistor to discharge the capacitor for a discharge time interval by conducting a transistor conduction current, the transistor coupled to the capacitor so that the capacitor has a discharge current substantially equal to the transistor conduction current during a first portion of the discharge time interval; and
    a second current source coupled to the transistor and the capacitor so that for a second portion of the discharge time interval the capacitor has a discharge current less than the transistor conduction current.

2. The PHY as set forth in claim 1, wherein the transistor is a pullup pMOSFET having a gate voltage substantially equal to the capacitor terminal voltage.

3. The PHY as set forth in claim 1, wherein the transistor is a pulldown nMOSFET having a gate voltage substantially equal to the capacitor terminal voltage.

4. An envelope detector to detect the envelope of a differential voltage signal, the envelope detector comprising:
    a node;
    a capacitor connected to the node, the node having a node voltage;
    a first current source to charge the capacitor so that the node voltage is indicative of the magnitude of the differential voltage signal;
    a transistor having a drain and having a gate connected to the node;
    a discharge-enable transistor to connect the drain of the transistor to the node;
    a second current source;
    a fine-discharge-enable transistor to connect the second current source to the drain of the transistor; and
    an output buffer coupled to the node to provide an output voltage indicative of the node voltage;
    wherein if the output voltage crosses a threshold, the transistor and the second current source in combination are coupled to the node to discharge the capacitor.

5. The envelope detector as set forth in claim 4, wherein the second current source comprises:
    a differential pair of transistors; and
    a current source transistor cascaded with the differential pair of transistors.

6. The envelope detector as set forth in claim 4, wherein the first current source is connected to the node to sink a first current from the node indicative of the magnitude of the differential voltage signal;
    the transistor is a pMOSFET; and
    the transistor and the second current source in combination are coupled to the node to source a second current to the node if the output voltage crosses the threshold.

7. The envelope detector as set forth in claim 6, wherein the pMOSFET has a drain current;
    the second current source conducts a conduction current; and
    the magnitude of the drain current is equal to the sum of the magnitude of the second current and the magnitude of the conduction current.

8. The envelope detector as set forth in claim 7, wherein the conduction current source is indicative of the magnitude of the differential voltage signal.

9. The envelope detector as set forth in claim 4, wherein the first current source is connected to the node to source a first current to the node indicative of the magnitude of the differential voltage signal;
    the transistor is a nMOSFET; and
    the transistor and the second current source in combination are coupled to the node to sink a second current from the node if the output voltage crosses the threshold.

10. The envelope detector as set forth in claim 9, wherein the nMOSFET has a drain current;
    the second current source conducts a conduction current; and
    the magnitude of the drain current is equal to the sum of the magnitude of the second current and the magnitude of the conduction current.

11. The envelope detector as set forth in claim 10, wherein the conduction current source is indicative of the magnitude of the differential voltage signal.

12. A communication system comprising:
- a network medium; and
- a PHY (physical layer) responsive to first and second voltages on the network medium, the PHY comprising:
  - a node having a node voltage;
  - a buffer to provide an output voltage indicative of the node voltage;
  - a capacitor connected to the node;
  - a first current source to charge the capacitor by conducting a first conduction current indicative of the magnitude of the difference of the first and second voltages;
  - a FET to discharge the capacitor for a discharge time interval by conducting a drain current, the FET having a gate connected to the node during the discharge time interval; and
  - a second current source coupled to the node during a portion of the discharge time interval so that the capacitor has a discharge current less in magnitude than the drain current.

13. The communication system as set forth in claim 12, further comprising:
- a MAC (media access control), wherein the PHY provides to the MAC an indication of detection if the output voltage crosses a threshold.

* * * * *